(12) United States Patent
Zhao et al.

(10) Patent No.: US 10,409,778 B1
(45) Date of Patent: Sep. 10, 2019

(54) DATA SERVICES FOR SOFTWARE DEFINED STORAGE SYSTEM

(71) Applicant: EMC IP Holding Company LLC, Hopkinton, MA (US)

(72) Inventors: Junping Zhao, Beijing (CN); Accela Zhao, Shanghai (CN); Ricky Sun, Beijing (CN); Kun Wang, Beijing (CN); Sanping Li, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 313 days.

(21) Appl. No.: 15/241,692

(22) Filed: Aug. 19, 2016

(51) Int. Cl.
*G06F 7/02* (2006.01)
*G06F 16/00* (2019.01)
*G06F 16/174* (2019.01)
*G06F 16/23* (2019.01)
*G06F 16/215* (2019.01)

(52) U.S. Cl.
CPC ...... *G06F 16/1748* (2019.01); *G06F 16/1744* (2019.01); *G06F 16/215* (2019.01); *G06F 16/2365* (2019.01)

(58) Field of Classification Search
CPC . H04L 67/1097; H04L 67/42; H04L 29/0604; G06F 3/067; G06F 17/30283; G06F 3/0641; G06F 16/27; G06F 16/172; G06F 16/1727; G06F 17/122; G06F 16/215; G06F 16/1748; H03M 7/30
See application file for complete search history.

(56) References Cited

U.S. PATENT DOCUMENTS

| | | | | |
|---|---|---|---|---|
| 8,572,163 B1* | 10/2013 | Bromley | ............. | G06F 16/1748 709/203 |
| 2002/0161908 A1* | 10/2002 | Benitez | ................... | G06F 8/65 709/231 |
| 2014/0195847 A1 | 7/2014 | Webman et al. | | |
| 2014/0297733 A1* | 10/2014 | Wang | ................ | H04L 67/1097 709/203 |
| 2015/0261776 A1* | 9/2015 | Attarde | ............... | G06F 16/1748 707/664 |
| 2016/0041970 A1* | 2/2016 | Tripathy | ............ | G06F 17/2705 707/755 |
| 2017/0091232 A1* | 3/2017 | Ghanbari | .......... | G06F 17/30303 |
| 2017/0208125 A1* | 7/2017 | Jai | ....................... | H04L 67/1097 |

OTHER PUBLICATIONS

EMC Corporation, "EMC ScaleIO User Guide, V1.32," Document No. 302-001-033, Rev. 11, May 2015, 536 pages.

* cited by examiner

*Primary Examiner* — Bruce M Moser
(74) *Attorney, Agent, or Firm* — Ryan, Mason & Lewis, LLP

(57) ABSTRACT

A method for processing a data request in a software defined storage system, wherein the software defined storage system comprises one or more nodes configured as a set of client modules operatively coupled to a set of server modules, comprises the following steps. A data request with a data set is received at one of the set of client modules. One or more data services (e.g., deduplication and/or data compression) are performed on the data set, wherein the performance of the one or more data services on the data set is dynamically shared between one or more of the set of client modules and one or more of the set of server modules.

17 Claims, 6 Drawing Sheets

100

DATA SERVICES FOR SOFTWARE DEFINED STORAGE SYSTEM

FIELD

The field relates generally to computing environments, and more particularly to implementation of one or more data services (e.g., data deduplication, data compression, etc.) in a software defined storage system.

BACKGROUND

Software defined storage (SD S) is a popular design model for data storage systems. SDS systems typically include a form of storage virtualization to separate the storage hardware from the software that manages the storage infrastructure. For example, SDS systems may employ cloud computing platforms, where "cloud" refers to a collective computing infrastructure that implements a cloud computing paradigm.

One example of an SDS system that is characterized by ease-of-use, flexibility, and scalability is ScaleIO™, which is commercially available from EMC Corporation of Hopkinton, Mass. Efficient data storage management in such a SDS system is important, especially as the system dynamically scales to accommodate changing storage requirements.

SUMMARY

Embodiments of the invention provide techniques for implementing one or more data services (e.g., data deduplication, data compression, etc.) in a SDS system.

For example, in one embodiment, a method for processing a data request in a software defined storage system, wherein the software defined storage system comprises one or more nodes configured as a set of client modules operatively coupled to a set of server modules, comprises the following steps. A data request with a data set is received at one of the set of client modules. One or more data services (e.g., deduplication and/or data compression) are performed on the data set, wherein the performance of the one or more data services on the data set is dynamically shared between one or more of the set of client modules and one or more of the set of server modules.

These and other features and advantages of the invention will become more readily apparent from the accompanying drawings and the following detailed description.

DETAILED DESCRIPTION

Figure 1:
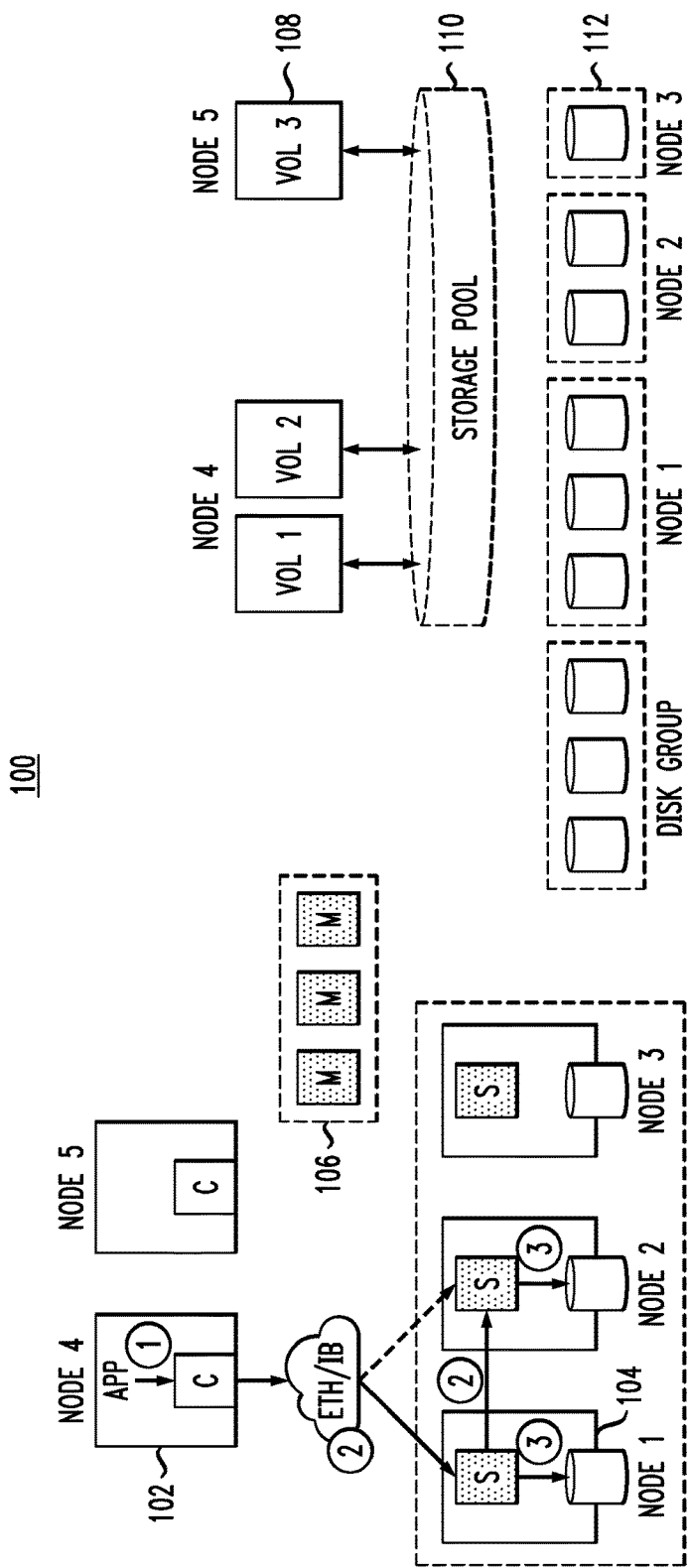
FIG. 1 illustrates a software defined storage system with which one or more embodiments of the invention may be implemented.

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

It is realized herein that the use of data services, such as, for example, data deduplication, data compression, checksum, etc., in conjunction with computing environments, such as, for example, a software defined storage system, has many advantages.

Data deduplication (or dedup as it is known in short) is a data service that segments an incoming data stream, uniquely identifies data segments, and then compares the segments to previously stored data. If the segment is unique, it is stored on disk. However, if an incoming data segment is a duplicate of what has already been stored, a reference is created to it and the segment is not stored again. For example, a file or volume that is backed up every week creates a significant amount of duplicate data. A data deduplication service analyzes the data and stores only the unique segments of a file. This process can provide an average of 10 to 30 times reduction in storage capacity requirements, with average backup retention policies on normal enterprise data. This means that companies can store 10 TB to 30 TB of backup data on 1 TB of physical disk capacity, which has huge economic benefits.

In conjunction with the data deduplication service, data compression is a data service that is used to compress the unique segments of a file before they are stored on disk. Data compression in a block-based storage system reduces the size of data on disk, typically increasing available capacity up to about 50 percent. Compression can typically be enabled automatically and operates in the background to avoid performance degradation.

More particularly, inline deduplication and/or compression are data services that are performed on data before or as it is being written to a storage device.

While illustrative embodiments below will be described in the context of software defined storage (SDS) system such as a ScaleIO™ system, it is to be appreciated that embodiments are not limited to any specific SDS system but rather can be implemented for many other SDS systems.

As is known, implementations utilizing ScaleIO™ can advantageously support hundreds or thousands of nodes, potentially providing one or more storage pools with a capacity on the order of a petabyte (PB). Such an arrangement overcomes scalability limitations inherent in certain conventional storage systems. Also, failure protection functionality provided by ScaleIO™ can be used to protect against failures in one or more of the nodes. Additional details regarding ScaleIO™ functionality that can be incorporated into illustrative embodiments can be found in, for example, EMC ScaleIO™ User Guide, V1.32, Document No. 302-001-033, Rev. 11, May 2015, which is incorporated by reference herein. Further illustrative details of a ScaleIO™ system that can be incorporated into illustrative embodiments may be found in U.S. Patent Publication No. 2014/0195847 published on Jul. 10, 2014 and entitled "Methods and Systems of Managing a Distributed Replica Based Storage," which is incorporated by reference herein.

FIG. 1 shows an SDS system 100 configured according to an illustrative embodiment. As shown, SDS system 100 is comprised of a plurality of nodes that function as client modules (labeled "C"), server modules (labeled "S"), and metadata modules (labeled "M"). A client module may occasionally be referred to as "client, while server module may occasionally be referred to as a "server." Reference numeral 102 represents the client modules, 104 represents the server modules, and 106 represents the metadata modules. Further, SDS system 100 includes a plurality of nodes that comprise storage volumes, one or more storage pools, and storage devices. Reference numeral 108 represents storage volumes, 110 represents storage pools, and 112 represents storage drives.

More particularly, a server module S in FIG. 1 manages one or more local storage drives (shown as part of the node and schematically represented as a cylinder) and/or remote storage drives (via a network file system (NFS), common Internet file system (CIFS), storage area network (SAN), remote direct memory access (RDMA), etc.), and exposes them as virtual resources that can cluster with other server modules.

A client module C is a driver-like daemon that exposes virtual storage to an application program (App) executing on its node, and is aware of data distribution over a set of one or more server modules S through efficient metadata (initially loaded from metadata modules M) and fast addressing. For example, application data generated at a client module C can be partitioned as chunks and distributed across many server modules S. Client modules can be connected to server modules by an Ethernet inter-bus (ETH/IB) in one illustrative embodiment.

A metadata module M typically operates in a high-availability (HA) cluster (as shown in FIG. 1, by way of example, three metadata modules form a cluster). The HA cluster provides management of cluster membership, system-wide consensus and configuration management, reporting, etc., which are functions not typically involved in the data path.

It is to be appreciated that the client, server, and metadata modules are logical software that can co-exist on the same physical node or virtual node, or can be distributed as shown on the left side of FIG. 1, as Nodes 1, 2, 3, 4, and 5. It is to be further understood that a client module, a server module, and a metadata module can also be deployed together in a specific node, in any combinations, such as, e.g., client+server, client+metadata, server+metadata, or client+server+metadata. For a server module, there are typically at least three instances for HA, and all three server modules act as a cluster. The dashed line in the figures around a set of modules denotes a cluster.

The right side of FIG. 1 illustrates an illustrative data hierarchy comprised of a set of storage drives implemented in server module nodes (e.g., Nodes 1, 2, 3, 4, and 5) grouped as one or more storage groups (disk groups or DGs). Also shown, a storage pool is built atop several DGs that cross multiple server module nodes. Virtual volumes then are created on the pool and mapped to specific client modules, e.g., vol1 and vol2 are assigned to client module labeled Node4, and accessible by an application program (App) via the client module.

FIG. 1 further illustrates a typical data flow using a write IO (input/output) or write request (or, more simply, a write) as an example. A write request typically includes a data set generated by (or otherwise provided by) an application program and that is to be written to a storage device. The circled numbers in the figure correspond to the following steps.

1. App issues a write and flush request to the virtual disk.
2. Client module takes over the data and sends the write request to the corresponding server modules, using a 2-mirror approach. For example, depending on how the topology and replica storage are implemented, the client module may broadcast the request to multiple server modules in parallel which enables more efficiency but introduces more complex logic in the client module. Alternatively, the client module can address only a primary server module, where the primary server module locates a secondary server module thus forming a pipeline or chain. In such case, the client module addresses the primary server module, and the primary server module broadcasts to its one or more replica nodes (i.e., secondary server modules).
3. Data with one copy (2-replica storage) respectively go to two server modules, and are persistently stored (i.e., persisted). An acknowledgement signal (Ack) is sent to the client module only when both replica writes are done.

Such an SDS architecture 100 as shown in FIG. 1 has many advantages. By way of example only, such advantages include:

Flexibility: as software modules, the client and server may run in the same node or separate nodes, and in physical node(s) or virtual node(s) (such as VMWare, KVM or Xen, etc.). For a cluster, the cluster can be fully mixed (heterogeneous) maximizing various kinds of hardware platforms, operating system platforms, virtualization platforms, etc. Further, the architecture can be implemented in a classic storage area network or SAN-like mode (App↔storage), a complete hyper-converged mode, or some combination of both modes.

Efficiency and elasticity: Data sets can be distributed across many server module nodes in a globally balanced manner, with fast addressing via extremely lightweight metadata (without a metadata module involved in normal 10). Given any occurrence of storage add/decrease/crash/maintenance, the data set can be quickly re-balanced or rebuilt.

Scalability: The metadata module is not a bottleneck, and the client module can communicate with various server modules in a peer-to-peer (p2p) manner. Accordingly, the server modules (and the client module as well) can be scaled to significant quantities in a linear manner.

However, it is realized herein, in accordance with one or more illustrative embodiments, that a SDS system architecture as illustrated in FIG. 1 could benefit from inline data services such as data deduplication and data compression.

Before describing illustrative embodiments, two typical inline deduplication/compression solutions will be discussed along with their design trade-offs and drawbacks in the context of FIGS. 2 and 3.

Figure 2:
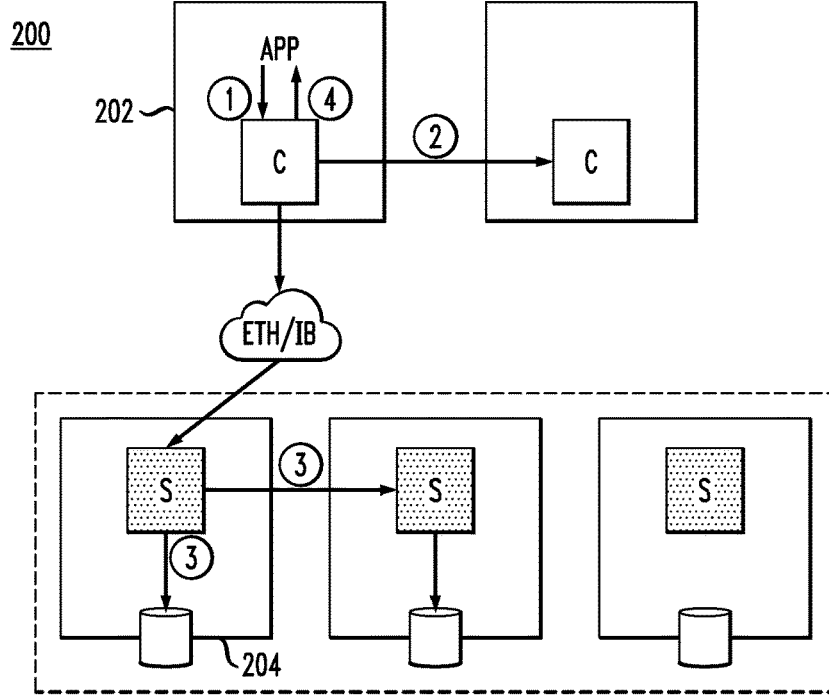
FIG. 2 illustrates a client-side data service solution for a software defined storage system.

FIG. 2 illustrates a first solution that attempts to provide inline data deduplication/compression to a SDS system. As shown in system 200, nodes functioning as client modules C are represented by reference numeral 202, while nodes functioning as server modules are represented by reference numeral 204.

System 200 is assumed to provide inline (and offline as well) deduplication/compression at 4 KB (KiloBytes) granularity. The example highlighted here involves steps for a write flow. The circled numbers in the figure correspond to the following steps.

1. The application (App) writes data to a local log (e.g., oplog, solid state drive (SSD) extent store) and mirrors the data to a peer node. The App then receives acknowledgement.

2. In a background asynchronous flush, compression (e.g., Snappy) and deduplication (e.g., SHA-1 based) are performed at that client (actually the client may be a set of virtual machines or VMs).

3. Over time, the reduced data set (after deduplication/compression) is tiered to a second global HDD (hard disk drive) pool.

4. An acknowledgement is sent to the App once the data is stored.

However, in the solution depicted in FIG. 2, deduplication/compression are performed at that specific client node (202), and thus these data services are not globally balanced and tend to overload the processing capacity of the client node. Furthermore, the FIG. 2 solution does not provide cross-client deduplication, but rather its deduplication domain is limited to the specific client node performing the deduplication.

Figure 3:
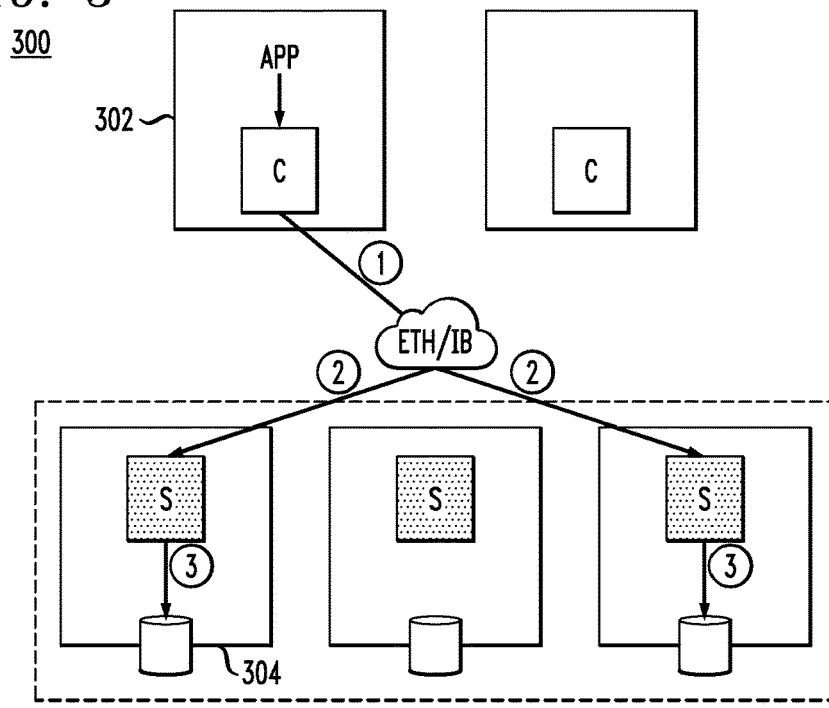
FIG. 3 illustrates a server-side data service solution for a software defined storage system.

FIG. 3 illustrates a second solution that attempts to provide inline data deduplication/compression to a SDS system. As shown in system 300, nodes functioning as client modules C are represented by reference numeral 302, while nodes functioning as server modules are represented by reference numeral 304.

System 300 is assumed to support deduplication/compression in VSAN6.2 for an all-flash configuration, with a write cache flash tier and a capacity flash tier. The example highlighted here involves steps for a write flow. The circled numbers in the figure correspond to the following steps.

1. The application (App) performs a synchronous write and data is globally distributed. Thus, the data is sent in parallel to servers that provide storage (2-mirror, for example).

2. The write data goes to each server's write cache tier (fast SSD) and an acknowledgment is sent back to the App.

3. In the background, each server runs its deduplication (SHA-1) and compression (LZ4) independently. Note, in this system 300 example, it is assumed that deduplication and compression must both either be on or off.

However, one drawback to the FIG. 3 solution is that more network traffic (raw, non-compressed data) is created from the client to the servers. Also, two servers execute duplicate tasks such as calculating SHA-1 on the same content twice, and compressing the same content twice.

Illustrative embodiments provide techniques that overcome the above and other drawbacks associated with existing solutions for providing inline data services (e.g., data deduplication/compression) in an SDS system architecture such as the one illustrated in FIG. 1. More particularly, illustrative embodiments provide inline data service in a globally balanced, flexible, high performance manner.

In accordance with illustrative embodiments, assuming fixed-length block-level compression and deduplication data services, some basic design rules are as follows:

Deduplication is enabled per volume or all volumes in a storage pool, and the deduplication domain is per server module node (data may be from multiple clients, and reside in a set of DGs). By the term "enable" here, it is meant that the data service is configured to deduplicate other data sets in the server module. Metadata such as "fingerprints" are maintained at a server module. As is known, deduplication metadata typically includes a fingerprint file and change logs. Fingerprints are the digital signatures (e.g., SHA-1) for every data block (e.g., 4-KB) in a storage volume. However, in accordance with illustrative embodiments, fingerprint calculations may run in a client module or a server module, and be dynamically adjusted.

Compression is enabled per volume or all volumes in a storage pool.

The computing tasks such as fingerprint calculation (e.g., SHA-1) or compression algorithm (e.g., gzip or LZ4) can be performed by the main central processing unit (CPU) of the physical processing device of the node or via an accelerator chip (e.g., ASIC, FGPA, etc.).

Deduplication and compression can be on or off independent of one another.

Figure 4:
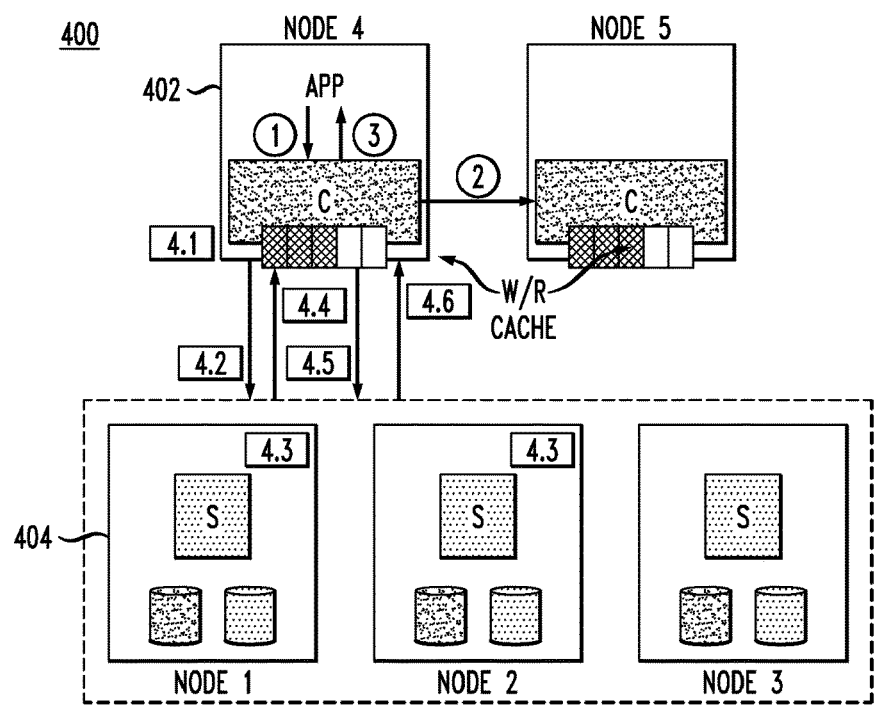
FIG. 4 illustrates a software defined storage system with data services functionality, according to a first embodiment of the invention.

FIG. 4 illustrates a SDS system architecture that implements inline data services according to an illustrative embodiment. As shown in system 400, nodes functioning as client modules C are represented by reference numeral 402, while nodes functioning as server modules S are represented by reference numeral 404.

In this illustrative embodiment, it is assumed that client modules support a fast mirrored write cache (write back) per user configuration, which could be implemented on a fast non-volatile random access memory or NVRAM (i.e., NVMe, SSD flash, NVDIMM) or a dynamic RAM or DRAM and mirroring between two nodes. However, eventually any dirty data would de-stage to the persistent storage at a server module as in the existing SDS data flow of FIG. 3.

FIG. 4 illustrates an example of a write-deduplication-compression flow. The circled and boxed numbers in the figure correspond to the following steps.

1. The application (App) issues a write request (with a given data set) to a mapped storage volume, which is intercepted by the client module C.

2. Assuming NVRAM is used, the data set of the write request can be cached by the client and fast-mirrored to another write cache at a peer node, i.e., Node5 in FIG. 4. Fast mirroring can be accomplished in an existing manner.

3. An acknowledgement is sent to the App once the data set is stored at both nodes. Thus, data in the write cache could be in a "write-protected" state.

4. (Note that step 4 is broken down into steps 4.1 through 4.6). The data set is asynchronously flushed to the original volume based on the write cache free capacity high water mark or HWM (e.g., 85% full) or based on timer (e.g., 1 second), where upon deduplication and compression are commenced.

4.1. If deduplication is enabled, fingerprints (e.g., SHA-1) can be calculated at the client module per a pre-defined policy (such as a load pressure as will be further explained below).

Depending on how the client module addresses the server module, there are two main ways to proceed. FIG. 4 shows the case where the client module is aware of (i.e., has knowledge of) both the primary and secondary server modules (in the example shown in system 400, Node 1 and Node 2, respectively).

4.2. The client module sends the fingerprints to the target server modules to query regarding any duplication of data.

4.3. Each server module compares the received fingerprint with its fingerprint database, for duplicate data. Each server module updates relevant metadata, e.g., increases reference count, or for a new fingerprint never seen before, adds the fingerprint and increases the reference.

Note, each server may have slightly different fingerprint databases, and thus may not necessarily return exactly identical unique information since data is split in chunks (e.g., 1 MB) and distributed across server nodes. Also, an intent log may be needed for metadata consistency and replay in case of a system crash.

4.4. Each server module responds to the client module about the unique (non-duplicated) data. That is, for example, the server module informs the client module what part of the data set to be written it does not already have or has not already processed.

4.5. The client module then sends the part of the data set that is unique or not duplicate (could be entire data set) to the server modules, whereby if compression is enabled, compression can be scheduled to run at the client module. Thus, only the unique (non-duplicated) data is compressed and transferred by the client module to the server modules.

The server modules persist (store) the received data to local storage.

4.6. Once each server module stores the received data and acknowledgements are sent to and received by the client module, the client module marks the data set in the write cache (e.g., Node5) as reclaimable or as designated to remain there for a subsequent read.

Advantageously, in accordance with illustrative embodiments, deduplication/compression can be scheduled and running in either the client module, the server module, or a coordinated-shared (for deduplication tasks) manner. This approach maximizes the capabilities on both the client module and the server module for cluster wide balance. Further, deduplication/compression are configured per storage volume or per pool. Thus, illustrative embodiments provide flexibility and self-adjusted capability, on the fly (real time), based on a flexible policy (e.g., resource usage, client/server capabilities, etc.) to avoid overload at either the client-side or the server-side.

Deduplication and fingerprint calculation can be done at the client module, while the full fingerprint database and lookup is done at each server module. Thus, deduplication tasks are broken down and shared by both client module and server module. As an example, if client CPU usage is too high (e.g., by policy or HWM), fingerprint computing can be moved entirely to the server module.

Illustrative embodiments specially optimize network traffic as compared to typical data 2-mirror approach wherein cluster-wide write traffic can be doubled. That is, inline compression is preferably performed at the client module as opposed to the server module, thus traffic is effectively reduced before going out to the network. Further, given that the fingerprint calculation is performed at the client module, the server module is queried only about the unique bitmap. Thus, only unique data is transferred from the client module to the server module or from primary server module to the secondary server module.

Still further, as compared with a virtual storage area network (VSAN), illustrative embodiments add a client-side fast write mirror cache. As such, a write request is quickly acknowledged to reduce latency. Data can be aggregated by the write cache for larger or more sequential IO, then deduplication/compression is scheduled during asynchronous flush or de-staging, towards the same incoming write data. Compression or SHA-1 is not run twice for the same content thus cluster-wide resource usage is more efficient and further helps the overall latency.

As compared with the solution outlined in FIG. 2 wherein deduplication/compression are performed in a specific client module (especially the metadata), illustrative embodiments enable intelligence at the client module for end-to-end performance (fast write mirror, cache, client side compression/fingerprint). The sever-side is typically configured for persistence of both data and metadata, and the deduplication domain is per server rather than per client. Thus, the data set from many clients (either primary replica or secondary replica) can be deduplicated for higher storage efficiency. Further, the fingerprint database is maintained server-side and any lookup or update is running in multiple server modules in parallel.

Deduplication typically has three steps: (A) fingerprint calculation for fixed-length chunk; (B) fingerprint lookup and update; and (C) persistently store the unique data.

As explained above, performing all three tasks at the client side (FIG. 2 solution) may overload the node. Also, the deduplication domain is too narrow thus impacting deduplication effectiveness. However, running all three tasks on the server side (FIG. 3 solution) raises similar overhead concerns. Also, two server nodes in fact would run duplicate tasks (step (A)) which is highly inefficient.

Illustrative embodiments enable flexible deduplication load-sharing between the client module (step (A)) and the server module (steps (B) and (C)). Such load-sharing can be configured as a static policy (e.g., step (A) always runs at the client module). Further, since the application (e.g., database, web server, analytics, etc.) is running at the client module and the fingerprint calculation is CPU intensive, to ensure application quality-of-service (QoS) and avoid client overload, the fingerprint calculation at the client module can be dynamically set on or off per policy which binds to resource usage and overall performance impact, such as:

1) Bind with client CPU usage with high water mark (HWM)/low water mark (LWM), or upper limit, i.e., if client CPU usage is lower than an LWM, turn on fingerprint calculation until HWM is exceeded, then the server takes over all three tasks until CPU usage returns to LWM/HWM range.

2) Bind with client or server processing capability. For example, even though running at the client module consumes certain client CPU capacity, the end-to-end performance is still much better than running at the server module due to different hardware configurations between the client module and the server module. This is due to client-side advantages such as reduced and unique data transferring over network, and no duplicate calculations, etc. Thus, the system may measure end-to-end IO performance for two cases (calculation at client or not), and thus make the decision based on the measured performance. This could be done periodically (e.g., every 3 minutes), per hardware change (e.g., more/less DRAM or drives, etc.), or per relevant software event such as a new volume being mapped to the client, etc.

3) Combination of above factors with advanced rules. For example, assume the default is calculation at the client module with a CPU HWM limit. Once the CPU usage exceeds that limit, the system measures the performance benefits to ensure sufficient gains. Similarly, if compression is enabled by a user on a specific volume, both compression and decompression is running at the client module by default since usually that would reduce network traffic. The user may also specify a CPU limit and, if exceeded, the system measures the benefits before turning off client calculation.

Figure 5:
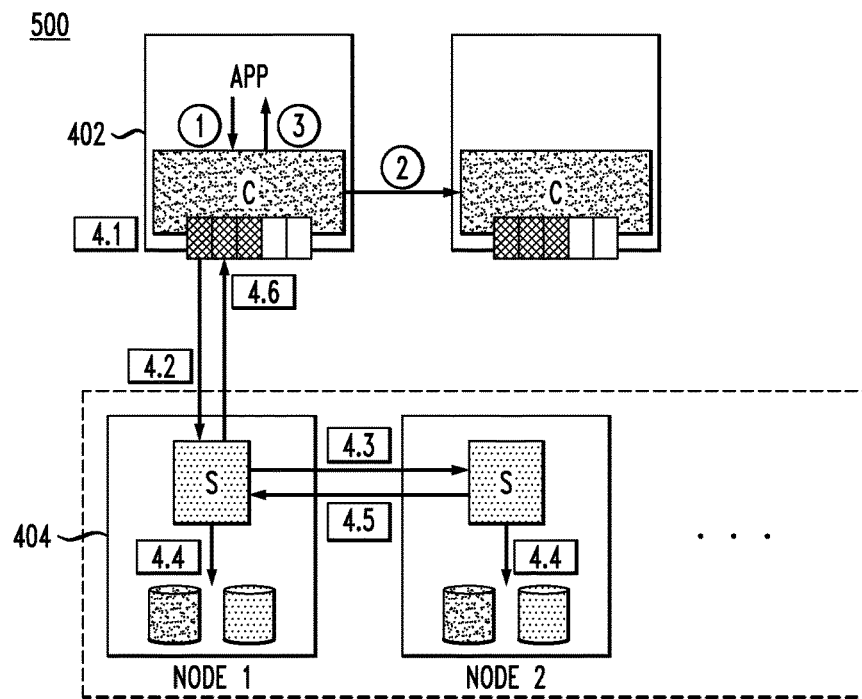
FIG. 5 illustrates a software defined storage system with data services functionality, according to a second embodiment of the invention.

In an alternative SDS implementation according to an illustrative embodiment, assume that the client module is only aware of (i.e., has knowledge of) and communicates with the primary server module (such as is the case in the current ScaleIO™ implementation). Then, in such a scenario, steps 1-3 and step 4.1 described above in the context of FIG. 4 are exactly the same, while the steps starting from step 4.2 are different. FIG. 5 illustrates a SDS system 500 configured to operate in this alternative scenario. A write request will be used as an example to explain the process. To maintain consistency of description, reference numeral 402 is used again to represent client modules and reference numeral 404 is used again to represent server modules. The circled and boxed numbers in the figure correspond to the steps of FIG. 4 and modified steps 4.2 to 4.6 depicted in FIG. 5. Note that a description of steps 1, 2, 3, and 4.1 is not repeated below since these steps are the same as explained above for FIG. 4. Thus, the description below of FIG. 5 picks up with step 4.2.

4.2. The client module sends fingerprints and the data set to the primary server module (Node1). If compression is enabled, data can be compressed to reduce network traffic.

4.3. The primary server module forwards the fingerprints to the secondary server module (Node2) to query any deduplications.

Note, in an extreme case, the fingerprint calculation may not run at the client module. If so, the fingerprint is calculated by the primary server module.

4.4. Meanwhile, the primary server module writes unique data to local storage and updates its metadata accordingly, and the secondary server module compares the received fingerprint with its fingerprint database.

4.5. The secondary server module informs the primary server module about unique data (i.e., data it does not already have or has not already processed), then the primary server module sends only the unique data of the data set to the secondary server module. The secondary server module then updates relevant fingerprints and/or journaling and persists the unique data.

Accordingly, pressure is offloaded from the secondary server module to the primary server module (such as the secondary server module not having to calculate the fingerprint). Also assuming the end-to-end latency is likely to be affected by the secondary server module, the network traffic between the primary server module and the secondary server module is reduced.

4.6. Once both server modules complete the write operation, the primary server module sends an acknowledgement to the client module whereby data in the write cache can then be overwritten or remain for a subsequent server read request.

Figure 6:
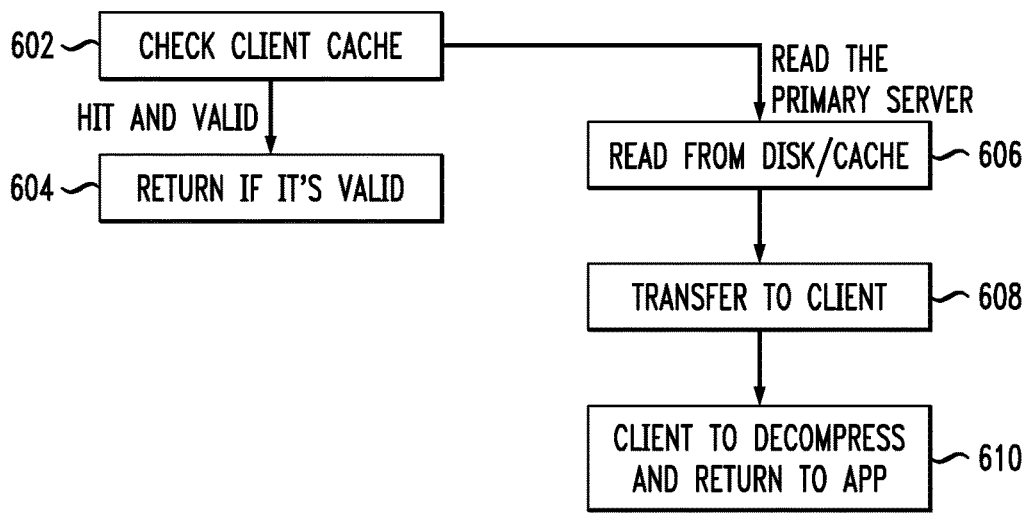
FIG. 6 illustrates read request processing in a software defined storage system with data services functionality, according to an embodiment of the invention.

FIG. 6 illustrates methodology 600 for performing a read IO (read request, or simply, a read), where data can be read from the primary server module. If there is a data verification or checksum mechanism, data content could be validated on the fly (real time) during read. If a problem or error arises, data may be read from one or more replicas (i.e., secondary server modules).

More specifically, step 602 checks the client module for a cache hit. If a valid hit is found, then the data is returned from the cache in step 604. However, if there is not a valid cache hit, then the read request is sent to the primary server module where the disk (and/or cache at the server module) is read in step 606. The data is transferred to the client module in step 608. The client module decompresses the data and returns the data to the application in step 610.

Figure 7:
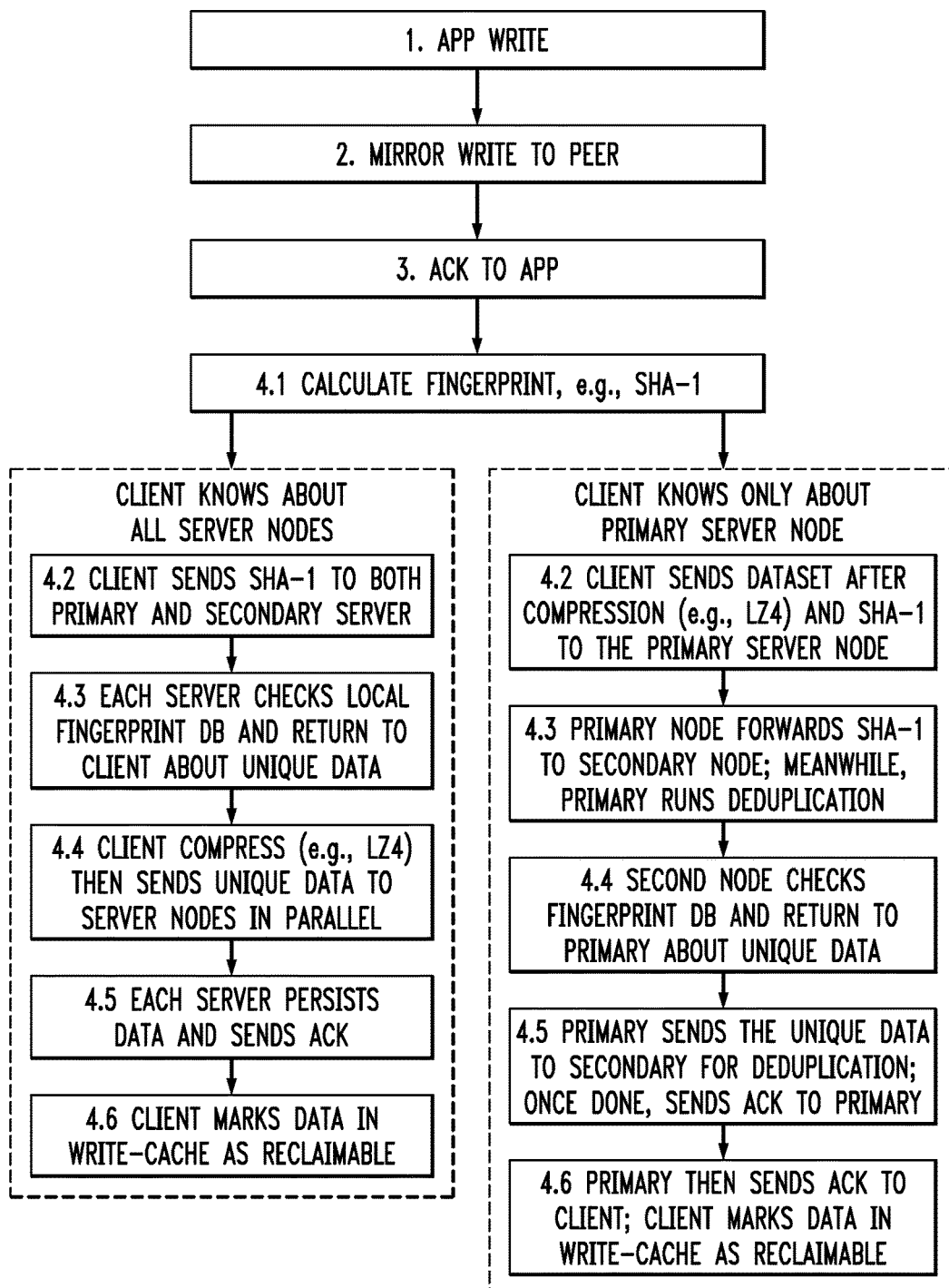
FIG. 7 illustrates write request processing in a software defined storage system with data services functionality, according to an embodiment of the invention.

FIG. 7 illustrates write-deduplication-compression handling routine flow 700 which specifically summarizes the steps described in detail above in the context of FIGS. 4 and 5. Recall that the left side of the lower part of the flow chart shows steps 4.2 through 4.6 for when the client module is aware of all the server modules (i.e., primary and secondary), while the right side of the lower part of the flow chart shows steps 4.2 through 4.6 for when the client is only aware of the primary server module. Recall also that steps 1, 2, 3, and 4.1 are the same regardless of the client's server-awareness.

Figure 8:
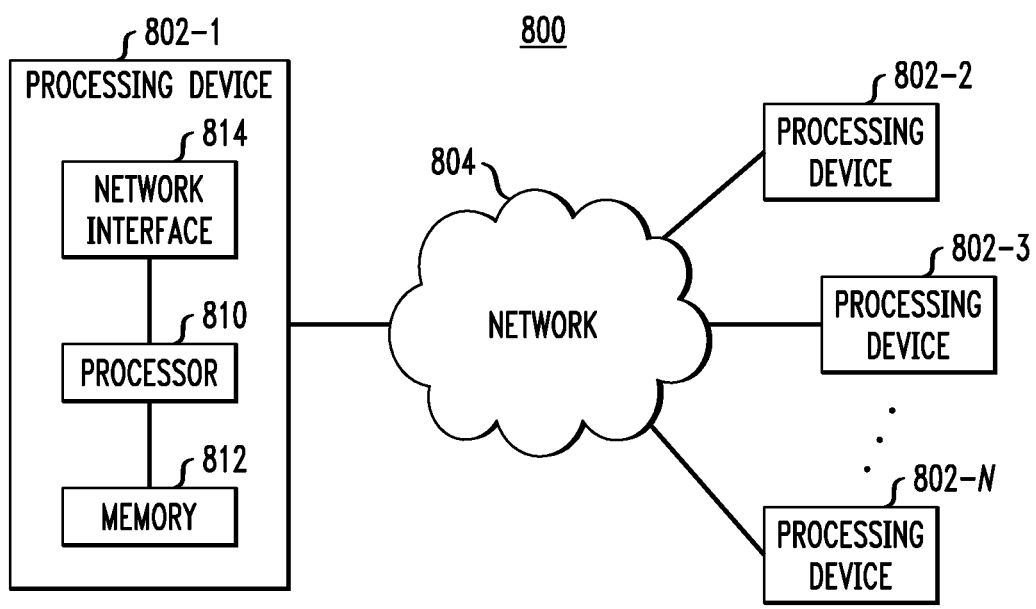
FIG. 8 illustrates a processing platform used to implement a software defined storage system with data services functionality, according to an embodiment of the invention.

FIG. 8 illustrates a processing platform used to implement a software defined storage system with one or more data services, according to an embodiment of the invention.

As an example of a processing platform on which a software defined storage system with data service functionalities (e.g., FIGS. 1-7) can be implemented is processing platform 800 shown in FIG. 8. It is to be appreciated that processing platform 800 may implement the functionalities described herein. For example, the various architectures and methodologies of FIGS. 3-9 can be implemented in processing platform 800.

The processing platform 800 in this embodiment comprises a plurality of processing devices, denoted 802-1, 802-2, 802-3, ... 802-N, which communicate with one another over a network 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the system shown as 800 in FIG. 8 may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for processing a data request in a software defined storage system, wherein the software defined storage system comprises one or more nodes configured as a set of client modules operatively coupled to a set of server modules, the method comprising:

receiving a data request with a data set at one of the set of client modules; and performing one or more data services on the data set, wherein the performance of the one or more data services on the data set is dynamically shared between one or more of the set of client modules and one or more of the set of server modules based on one or more criteria associated with at least one of the one or more of the set of client modules and the one or more of the set of server modules;

wherein the one or more criteria comprises at least resource usage at the one or more of the set of client modules;

wherein calculation of a fingerprint for the data set is performed at the one or more of the set of client modules until a threshold of the resource usage is reached, and then the calculation is moved to one of the set of server modules;

wherein the one or more data services comprise at least one of data deduplication and data compression; and wherein data compression is performed at one of the set of client modules.

2. The method of claim 1, wherein tasks associated with data deduplication are dynamically shared between the one or more of the set of client modules and the one or more of the set of server modules based on the one or more criteria.

3. The method of claim 2, wherein the resource usage comprises central processing unit usage.

4. The method of claim 2, wherein the one or more criteria comprises processing capability.

5. The method of claim 2, wherein the data deduplication tasks comprise: calculation of the fingerprint for the data set; fingerprint lookup and update; and persisting the non-duplicate part of the data set.

6. The method of claim 5, wherein fingerprint lookup and update, and persisting the non-duplicate part of the data set are performed at one of the set of server modules.

7. A method for processing a data request in a software defined storage system, wherein the software defined storage system comprises one or more nodes configured as a set of client modules operatively coupled to a set of server modules, the method comprising:

receiving a data request with a data set at one of the set of client modules;

performing one or more data services on the data set, wherein the performance of the one or more data services on the data set is dynamically shared between one or more of the set of client modules and one or more of the set of server modules based on one or more criteria associated with at least one of the one or more of the set of client modules and the one or more of the set of server modules; and caching the data set in a write cache at one of the set of client modules;

wherein the one or more criteria comprises at least resource usage at the one or more of the set of client modules; and wherein calculation of a fingerprint for the data set is performed at the one or more of the set of client modules until a threshold of the resource usage is reached, and then the calculation is moved to one of the set of server modules.

8. A method for processing a data request in a software defined storage system, wherein the software defined storage system comprises one or more nodes configured as a set of client modules operatively coupled to a set of server modules, the method comprising:

receiving a data request with a data set at one of the set of client modules; and performing one or more data services on the data set, wherein the performance of the one or more data services on the data set is dynamically shared between one or more of the set of client modules and one or more of the set of server modules based on one or more criteria associated with at least one of the one or more of the set of client modules and the one or more of the set of server modules;

wherein the one or more criteria comprises at least resource usage at the one or more of the set of client modules;

wherein calculation of a fingerprint for the data set is performed at the one or more of the set of client modules until a threshold of the resource usage is reached, and then the calculation is moved to one of the set of server modules; and wherein one of the set of server modules functions as a primary server module and another one of the set of server modules functions as a secondary server module.

9. The method of claim 8, wherein one of the set of client modules communicates with both the primary server module and the secondary server module to perform the one or more data services.

10. The method of claim 8, wherein one of the set of client modules communicates with the primary server module, and the primary server module communicates with the secondary server module to perform the one of more data services.

11. The method of claim 8, wherein performing the one or more data services further comprises one of the set of client modules sending the fingerprint of the data set to the primary server module and the secondary server module.

12. The method of claim 11, wherein performing the one or more data services further comprises both the primary server module and the secondary server module checking their respective local fingerprint databases and informing the one of the set of client modules about what part of the data set is unique thereto.

13. The method of claim 12, wherein performing the one or more data services further comprises:
the one of the set of client modules compressing the unique part of the data set and sending the compressed data to the primary server module and the secondary server module for storage; and
the primary server module and the secondary server module sending respective acknowledgement signals to the one of the set of client modules.

14. The method of claim 8, wherein performing the one or more data services further comprises:
one of the set of client modules compressing the data set and sending the fingerprint of the data set and the compressed data set to the primary server module;
the primary server module sending the fingerprint to the secondary server module; and
the primary server module performing deduplication on the data set.

15. The method of claim 14, wherein performing the one or more data services further comprises:
the secondary server module checking its local fingerprint databases and informing the primary server module about what part of the data set is unique thereto;
the primary server module sending the unique part of the data set to the secondary server module, and the secondary server module performing deduplication on the received data; and the secondary server module sending an acknowledgement signal to the primary server module, and the primary server module sending an acknowledgement signal to the one of the set of client modules.

16. A software defined storage system for processing a data request, wherein the software defined storage system comprises one or more nodes configured as a set of client modules operatively coupled to a set of server modules, the system comprising:
at least one processor, coupled to a memory, and configured to:
receive a data request with a data set at one of the set of client modules;
perform one or more data services on the data set, wherein the performance of the one or more data services on the data set is dynamically shared between one or more of the set of client modules and one or more of the set of server modules based on one or more criteria associated with at least one of the one or more of the set of client modules and the one or more of the set of server modules; and
cache the data set in a write cache at one of the set of client modules;
wherein the one or more criteria comprises at least resource usage at the one or more of the set of client modules; and
wherein calculation of a fingerprint for the data set is performed at the one or more of the set of client modules until a threshold of the resource usage is reached, and then the calculation is moved to one of the set of server modules.

17. An article of manufacture for processing a data request in a software defined storage system, wherein the software defined storage system comprises one or more nodes configured as a set of client modules operatively coupled to a set of server modules, the article of manufacture comprising a processor-readable storage medium having encoded therein executable code of one or more software programs, wherein the one or more software programs when executed by at least one processing device implement the steps of:
receiving a data request with a data set at one of the set of client modules;
performing one or more data services on the data set, wherein the performance of the one or more data services on the data set is dynamically shared between one or more of the set of client modules and one or more of the set of server modules based on one or more criteria associated with at least one of the one or more of the set of client modules and the one or more of the set of server modules; and
caching the data set in a write cache at one of the set of client modules;
wherein the one or more criteria comprises at least resource usage at the one or more of the set of client modules; and
wherein calculation of a fingerprint for the data set is performed at the one or more of the set of client modules until a threshold of the resource usage is reached, and then the calculation is moved to one of the set of server modules.

* * * * *